United States Patent
Kose et al.

(10) Patent No.: US 8,927,668 B2
(45) Date of Patent: Jan. 6, 2015

(54) FLUORINATED ELASTIC COPOLYMER AND METHOD FOR ITS PRODUCTION

(75) Inventors: Takehiro Kose, Tokyo (JP); Mitsuru Seki, Tokyo (JP); Go Mizuno, Tokyo (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 13/551,157

(22) Filed: Jul. 17, 2012

(65) Prior Publication Data

US 2012/0289661 A1 Nov. 15, 2012

Related U.S. Application Data

(63) Continuation of application No. PCT/JP2011/051652, filed on Jan. 27, 2011.

(30) Foreign Application Priority Data

Jan. 29, 2010 (JP) .................................. 2010-019228

(51) Int. Cl.
*C08F 214/26* (2006.01)
*H01B 3/44* (2006.01)

(52) U.S. Cl.
CPC .......... *C08F 214/26* (2013.01); *C08F 214/265* (2013.01); *C08F 214/262* (2013.01); *H01B 3/445* (2013.01)
USPC .................... 526/247; 526/255; 526/348.8

(58) Field of Classification Search
USPC ...................... 526/255, 247, 348.8
See application file for complete search history.

(56) References Cited

U.S. PATENT DOCUMENTS

| 3,723,270 A * | 3/1973 | Tabata et al. ............... 522/5 |
| 3,892,641 A * | 7/1975 | Tabata et al. ............... 522/187 |
| 4,277,586 A | 7/1981 | Ukihashi et al. |
| 5,037,921 A * | 8/1991 | Carlson ................ 526/247 |
| 5,102,965 A | 4/1992 | Carlson |
| 6,372,870 B1 * | 4/2002 | Kitahara et al. ............... 526/250 |
| 6,703,450 B2 * | 3/2004 | Bauerle et al. ............. 525/326.3 |
| 7,576,164 B2 | 8/2009 | Bauerle et al. |
| 2003/0208003 A1 | 11/2003 | Schmiegel |
| 2007/0100101 A1 | 5/2007 | Hung et al. |
| 2007/0123672 A1 * | 5/2007 | Funaki et al. ................ 526/247 |
| 2011/0015342 A1 * | 1/2011 | Kose et al. ................... 524/758 |

FOREIGN PATENT DOCUMENTS

| CN | 101824119 A * | 9/2010 |
| EP | 48308 A1 * | 3/1982 |
| EP | 1 808 448 A1 | 7/2007 |
| JP | 52-035289 | 3/1977 |
| JP | 56-084711 | 7/1981 |
| JP | 58-057209 | 4/1983 |
| JP | 03-176907 | 7/1991 |
| JP | 05-222130 | 8/1993 |
| JP | 07-018002 | 1/1995 |
| JP | 2001-176336 | 6/2001 |
| JP | 2009-513796 | 4/2009 |
| JP | 2009-280687 | 12/2009 |
| WO | WO 2008/106189 | 9/2008 |
| WO | WO 2009/119202 | 10/2009 |
| WO | WO 2010/053056 A1 | 5/2010 |

OTHER PUBLICATIONS

Machine translation of CN 101824119 A, Aug. 2013.*
International Search Report issued Apr. 12, 2011 in PCT/JP2011/051652 filed Jan. 27, 2011.

* cited by examiner

*Primary Examiner* — Nicole M Buie-Hatcher
(74) *Attorney, Agent, or Firm* — Oblon, Spivak, McClelland, Maier & Neustadt, L.L.P.

(57) ABSTRACT

To provide a fluorinated elastic copolymer which is excellent in crosslinking reactivity and extrusion moldability and which is curable to obtain a rubber excellent in permanent compression set resistance, base resistance and oil resistance and particularly suitable as a covering material for electric wires. A fluorinated elastic copolymer obtained by copolymerizing tetrafluoroethylene, propylene and optionally another monomer, wherein the molar ratio (a)/(b) of repeating units (a) derived from tetrafluoroethylene to repeating units (b) derived from propylene in the fluorinated elastic copolymer is from 60/40 to 75/25, and repeating units (c) derived from said another monomer is from 0 to 10 mol % in the fluorinated elastic copolymer.

7 Claims, No Drawings

FLUORINATED ELASTIC COPOLYMER AND METHOD FOR ITS PRODUCTION

CROSS-REFERENCE TO RELATED APPLICATIONS

This application is a Continuation of PCT/JP2011/051652 filed on Jan. 27, 2011. This application is based upon and claims the benefit of priority to Japanese Application No. 2010-019228 filed on Jan. 29, 2010. The contents of these applications are incorporated herein by reference in their entirety.

BACKGROUND OF THE INVENTION

1. Technical Field

The present invention relates to a fluorinated elastic copolymer and a method for its production. Particularly, it relates to a fluorinated elastic copolymer which is excellent in crosslinking reactivity and has high fluidity, and which is crosslinkable to obtain a crosslinked rubber excellent in permanent compression set and base resistance, and a method for its production.

2. Background Art

Fluorinated elastic copolymers are excellent in heat resistance, chemical resistance, oil resistance, weather resistance, etc. and thus can be applied to a severe environment wherein usual hydrocarbon type materials are not durable. As such fluorinated elastic copolymers, a vinylidene fluoride/hexafluoropropylene copolymer, a tetrafluoroethylene/propylene copolymer, a tetrafluoroethylene/perfluoro(alkyl vinyl ether) copolymer, etc. are known.

Among them, a tetrafluoroethylene/propylene copolymer is excellent in amine resistance and high temperature vapor resistance and also excellent in an electric insulation property, as compared with the above fluorinated elastic copolymer containing repeating units derived from vinylidene fluoride, and thus has been widely used as e.g. a covering material for electric wires (Patent Documents 1 and 2). However, such a tetrafluoroethylene/propylene copolymer has such a nature that is likely to be swollen by an apolar solvent such as gasoline or automatic transmission oil and thus has had a problem that its use is limited under such an environment where it is exposed to such a solvent atmosphere.

These fluorinated elastic copolymers are poor in reactivity, and their crosslinking reactivity is not sufficient, and heretofore, methods of introducing reactive functional groups to improve the reactivity have been proposed. Among them, in order to improve the crosslinking reactivity by a peroxide, a method of copolymerizing a special curable monomer, a method of carrying out polymerization in the presence of a chain transfer agent having a reactive functional group, a method of pretreating a fluorinated elastic copolymer before crosslinking by a peroxide, etc. have been practically adopted. For example, a fluorinated elastic copolymer obtained by copolymerizing tetrafluoroethylene and propylene in the presence of a fluorinated chain transfer agent having an iodine atom, has iodine atoms at the polymer terminals, whereby crosslinking with a peroxide is possible (Patent Document 3).

PRIOR ART DOCUMENTS

Patent Documents

Patent Document 1: JP-A-58-57209
Patent Document 2: JP-A-2001-176336
Patent Document 3: JP-A-5-222130

DISCLOSURE OF INVENTION

Technical Problem

However, the methods disclosed in the above Patent Documents had a problem such that the polymerization rates were slow, and the productivity of the fluorinated elastic copolymer was very low. Further, the obtainable fluorinated elastic copolymers were inadequate in the crosslinking reactivity, and various properties of the crosslinked rubbers including the permanent compression set were also not satisfactory.

Further, these fluorinated elastic copolymers were poor in extrusion moldability and had a problem such that it was difficult to make the surface of molded products smooth, and the productivity was low.

Therefore, it has been desired to develop a fluorinated elastic copolymer which is excellent in crosslinking reactivity and extrusion moldability and which is crosslinkable to obtain a crosslinked rubber excellent in permanent compression set resistance, base resistance and oil resistance and particularly suitable as a covering material for electric wires.

Thus, it is an object of the present invention to provide a fluorinated elastic copolymer which is excellent in crosslinking reactivity and extrusion moldability and which is crosslinkable to obtain a crosslinked rubber excellent in permanent compression set resistance, base resistance and oil resistance and particularly suitable as a covering material for electric wires, and a method for its production.

Solution to Problem

The present inventors have conducted an extensive study in order to solve the above problem and as a result, have found it possible to solve the above problem by making a copolymer which contains repeating units derived from tetrafluoroethylene and repeating units derived from propylene in a specific ratio and which optionally contains repeating units derived from another monomer, and have accomplished the present invention.

That is, the fluorinated elastic copolymer of the present invention is a fluorinated elastic copolymer obtained by copolymerizing tetrafluoroethylene, propylene and optionally another monomer, wherein the molar ratio (a)/(b) of repeating units (a) derived from tetrafluoroethylene to repeating units (b) derived from propylene in the fluorinated elastic copolymer is from 60/40 to 75/25, and repeating units (c) derived from said another monomer is from 0 to 10 mol % in the fluorinated elastic copolymer.

In the fluorinated elastic copolymer of the present invention, it is preferred that said another monomer is a perfluoro (alkyl vinyl ether).

Further, the fluorinated elastic copolymer of the present invention preferably has iodine atoms.

The fluorinated elastic copolymer composition of the present invention is one containing the above fluorinated elastic copolymer.

The crosslinked rubber of the present invention is one obtained by crosslinking the above fluorinated elastic copolymer with an organic peroxide.

The covered electric wire of the present invention is one obtained by crosslinking a composition containing the above fluorinated elastic copolymer.

The method for producing a fluorinated elastic copolymer of the present invention is a method for producing the above fluorinated elastic copolymer, which comprises copolymerizing the tetrafluoroethylene, the propylene and optionally said another monomer in the presence of a radical polymerization initiator and an iodine compound represented by the formula $RI_2$ (wherein R is an alkylene group or a perfluoroalkylene group, having at least 3 carbon atoms).

Advantageous Effects of Invention

The fluorinated elastic copolymer of the present invention is excellent in crosslinking reactivity and extrusion moldability and is crosslinkable to obtain a crosslinked rubber excellent in permanent compression set resistance, base resistance and oil resistance and particularly suitable as a covering material for electric wires.

DESCRIPTION OF EMBODIMENTS

Now, embodiments of the fluorinated elastic copolymer of the present invention will be described in detail.

The fluorinated elastic copolymer of the present invention is a fluorinated elastic copolymer obtained by copolymerizing tetrafluoroethylene (hereinafter referred to as TFE) and propylene (hereinafter referred to as P).

The ratio (a)/(b) of repeating units (a) derived from TFE to repeating units (b) derived from P in the fluorinated elastic copolymer is (a)/(b)=60/40 to 75/25 (molar ratio). Preferably, (a)/(b)=63/37 to 75/25 (molar ratio), further preferably (a)/(b)=65/35 to 70/30 (molar ratio). Within such a range, the copolymer is excellent in crosslinking reactivity and extrusion moldability, and the crosslinked rubber will be excellent in base resistance and oil resistance. If the ratio of (a) becomes higher than (a)/(b)=70/30, the elastic nature tends to be lost, and the obtainable crosslinked rubber tends to be brittle, such being undesirable.

To the fluorinated elastic copolymer of the present invention, in addition to TFE and P, another monomer may be copolymerized within a range not to impair the effects of the present invention. Repeating units (c) derived from such another monomer are from 0 to 10 mol % in the fluorinated elastic copolymer.

Such another monomer may, for example, be a fluorinated olefin such as monofluoroethylene, trifluoroethylene, trifluoropropylene, pentafluoropropylene, hexafluoropropylene, hexafluoroisobutylene or dichlorodifluoroethylene, a perfluoroalkyl vinyl ether such as perfluoromethyl vinyl ether, perfluoroethyl vinyl ether, perfluoropropyl vinyl ether, perfluoro(3,6-dioxa-5-methyl-octene) or perfluoro(ethoxyethyl vinyl ether), a hydrocarbon olefin such as ethylene, 1-butene or isobutylene, an alkyl vinyl ether such as methyl vinyl ether, ethyl vinyl ether, butyl vinyl ether or cyclohexyl vinyl ether, a vinyl ester such as vinyl acetate or vinyl propionate, vinyl chloride, vinylidene chloride, or trifluorostyrene.

As such another monomer, a fluorinated olefin or a perfluoroalkyl vinyl ether is preferred, and a perfluoroalkyl vinyl ether is more preferred.

As the perfluoroalkyl vinyl ether, perfluoromethyl vinyl ether or perfluoropropyl vinyl ether is more preferred.

In the production of the fluorinated elastic copolymer of the present invention, as the ratio of monomers to be present in the reaction system during the polymerization in order to obtain a fluorinated elastic copolymer with the above-mentioned copolymerized ratio, TFE/P=90/10 to 99/1 (molar ratio) is preferred, 93/7 to 98/2 (molar ratio) is more preferred, 95/5 to 98/2 (molar ratio) is most preferred. If the ratio of TFE becomes higher than TFE/P=99/1, the polymerization rate remarkably increases, whereby the polymerization reaction is likely to be unstable or likely to go out of control, such being undesirable.

In the method for producing a fluorinated elastic copolymer of the present invention, it is preferred to copolymerize tetrafluoroethylene and propylene, and optionally another monomer, in the presence of a radical polymerization initiator and an iodine compound represented by the formula $RI_2$. When the copolymerization is carried out in the presence of the iodine compound, the iodine compound acts as a chain transfer agent to introduce iodine to the molecular terminals of the fluorinated elastic copolymer. Such iodine terminal groups are excellent in radical reactivity and thus are excellent in reactivity at the time of a crosslinking reaction by an organic peroxide.

The iodine compound represented by the formula $RI_2$ is a compound having iodine atoms bonded to both terminals of an alkylene group or a perfluoroalkylene group, having at least 3, preferably from 3 to 8, carbon atoms. As a specific example, a diiodine compound having an alkylene group, such as 1,3-diiodopropane, 1,4-diiodobutane, 1,6-diiodohexane or 1,8-diiodooctane, or a diiodine compound having a perfluoroalkylene group, such as 1,3-diiodoperfluoropropane, 1,4-diiodoperfluorobutane, 1,6-diiodoperfluorohexane or 1,8-diiodoperfluorooctane, may, for example, be mentioned. As the iodine compound represented by the formula $RI_2$, an iodine compound having a perfluoroalkylene group is more preferred, and particularly, 1,4-diiodoperfluorobutane is most preferred.

In the present invention, the iodine compound represented by the formula $RI_2$ is preferably added so that the total amount of iodine atoms in the fluorinated elastic copolymer will be from 0.01 to 5.0 mass % to the amount of the formed polymer. Further, it is particularly preferred to add it so that the total amount of iodine atoms will be from 0.1 to 1.0 mass %.

In the method for producing a fluorinated elastic copolymer of the present invention, the polymerization method may, for example, be an emulsion polymerization method, a solution polymerization method, a suspension polymerization method or a bulk polymerization method. Particularly, an emulsion polymerization method for polymerizing monomers such as TFE and P in an aqueous medium in the presence of an emulsifier, is preferred from such a viewpoint that adjustment of the molecular weight and the copolymer composition can easily be made, and the productivity is excellent.

As the aqueous medium, water, or water containing a water-soluble organic solvent, may be mentioned, and water containing a water-soluble organic solvent, is more preferred.

The water-soluble organic solvent may, for example, be tert-butanol, propylene glycol, dipropylene glycol, dipropylene glycol monomethyl ether or tripropylene glycol.

As the water-soluble organic solvent, tert-butanol, propylene glycol or dipropylene glycol monomethyl ether is preferred, and tert-butanol is more preferred. The content of the water-soluble organic solvent in the aqueous medium is preferably from 1 to 50 parts by mass, more preferably from 3 to 20 parts by mass, per 100 parts by mass of water.

In the emulsion polymerization method, the pH of the aqueous medium is preferably from 7 to 14, more preferably from 7 to 11, further preferably from 7.5 to 11, most preferably from 8 to 10.5. If the pH is smaller than 7, when an iodine compound is used, the stability of the iodine compound is likely to deteriorate, and the crosslinking reactivity of the obtainable fluorinated elastic copolymer is likely to deteriorate.

The period for maintaining the pH of the aqueous medium within the above range is preferably the entire polymerization period between the start and the end of the emulsion polymerization, but it may not be the entire polymerization period. It is preferably at least 80%, more preferably at least 90%, further preferably at least 95%, of the entire polymerization period.

For the adjustment of the pH, it is preferred to use a pH buffering agent. As the pH buffering agent, an inorganic salt or the like may be mentioned. The inorganic salt may, for example, be a phosphate such as disodium hydrogenphosphate or sodium dihydrogenphosphate, or a carbonate such as sodium hydrogencarbonate or sodium carbonate. A more preferred specific example of a phosphate may be disodium hydrogenphosphate dihydrate or disodium hydrogenphosphate dodecahydrate.

The emulsifier is preferably an ionic emulsifier, more preferably an anionic emulsifier, since the mechanical and chemical stability of a latex of a fluorinated elastic copolymer thereby obtainable will be excellent.

As such an anionic emulsifier, a known emulsifier may be used. As a specific example, a hydrocarbon type emulsifier such as sodium laurylsulfate or sodium dodecylbenzensulfonate, a fluorinated alkanoic acid salt such as an ammonium perfluorooctanoate or ammonium perfluorohexanoate, or a fluorinated ether carboxylic acid compound represented by the formula (1): $R^{f1}OR^{f2}COOA$ (wherein $R^{f1}$ is a $C_{1-10}$ perfluoroalkyl group, $R^{f2}$ is a linear fluorinated alkylene group, the fluorinated alkylene group may have an etheric oxygen atom, the fluorinated alkylene group may have a side chain of a $C_{1-3}$ perfluoroalkyl group, A is a hydrogen atom, an alkali metal or $NH_4$, and the number of carbon atoms in $R^{f2}$ is preferably from 1 to 12, more preferably from 1 to 8) (hereinafter referred to as the compound of the formula (1)). The compound of the formula (1) is preferably a fluorinated ether carboxylic acid compound represented by the formula (2): $F(CF_2)_pO(CF(X)CF_2O)_qCF(X)COOA$ (wherein X is a fluorine atom or a $C_{1-3}$ perfluoroalkyl group, A is a hydrogen atom, an alkali metal or $NH_4$, p is an integer of from 1 to 10, and q is an integer of from 0 to 3) (hereinafter referred to as the compound of the formula (2)).

As the emulsifier in the present invention, a fluorinated emulsifier is preferred, and a fluorinated alkanoic acid salt or the compound of the formula (1) is more preferred. Further, the compound of the formula (2) is most preferred.

As the compound represented by the formula (1) or the compound represented by the formula (2), a specific example of the compound wherein A is $NH_4$, may, for example, be $C_2F_5OCF_2COONH_4$, $C_3F_7OCF_2COONH_4$, $C_4F_9OCF_2COONH_4$, $C_5F_{11}OCF_2COONH_4$, $C_6F_{13}OCF_2COONH_4$, $CF_3OCF_2CF_2OCF_2COONH_4$, $C_2F_5OCF_2CF_2OCF_2COONH_4$, $C_3F_7OCF_2CF_2OCF_2COONH_4$, $C_4F_9OCF_2CF_2OCF_2COONH_4$, $C_5F_{11}OCF_2CF_2OCF_2COONH_4$, $C_6F_{13}OCF_2CF_2OCF_2COONH_4$, $C_2F_5O(CF_2CF_2O)_2CF_2COONH_4$, $C_3F_7O(CF_2CF_2O)_2CF_2COONH_4$, $C_4F_9O(CF_2CF_2O)_2CF_2COONH_4$, $C_5F_{11}O(CF_2CF_2O)_2CF_2COONH_4$, $C_6F_{13}O(CF_2CF_2O)_2CF_2COONH_4$, $C_2F_5O(CF_2CF_2O)_3CF_2COONH_4$, $C_3F_7O(CF_2CF_2O)_3CF_2COONH_4$, $C_4F_9O(CF_2CF_2O)_3CF_2COONH_4$, $C_5F_{11}O(CF_2CF_2O)_3CF_2COONH_4$, $C_6F_{13}O(CF_2CF_2O)_3CF_2COONH_4$, $C_2F_5OCF(CF_3)COONH_4$, $C_3F_7OCF(CF_3)COONH_4$, $C_4F_9OCF(CF_3)COONH_4$, $C_2F_5OCF(CF_3)CF_2OCF(CF_3)COONH_4$, $C_3F_7OCF(CF_3)CF_2OCF(CF_3)COONH_4$, $C_2F_5O(CF(CF_3)CF_2O)_2CF(CF_3)COONH_4$, $C_3F_7O(CF(CF_3)CF_2O)_2CF(CF_3)COONH_4$, $CF_3O(CF_2)_3OCF_2COONH_4$, $C_2F_5O(CF_2)_3OCF_2COONH_4$, $CF_3O(CF_2)_3O(CF_2)_2COONH_4$, $CF_3CF_2O(CF_2)_2O(CF_2)_2COONH_4$, $CF_3O(CF_2)_3OCF(CF_3)COONH_4$, $C_2F_5O(CF_2)_3OCF(CF_3)COONH_4$, $CF_3O(CF_2)_3O(CF_2)_2COONH_4$, or $CF_3OCF_2OCF_2OCF_2COONH_4$.

An example of the most preferred compound represented by the formula (2) may, for example, be $F(CF_2)_2OCF_2CF_2OCF_2COONH_4$, $F(CF_2)_2O(CF_2CF_2O)_2CF_2COONH_4$, $F(CF_2)_3O(CF(CF_3)CF_2O)_2CF(CF_3)COONH_4$, $F(CF_2)_3OCF_2CF_2OCF_2COONH_4$, $F(CF_2)_3O(CF_2CF_2O)_2CF_2COONH_4$, $F(CF_2)_4OCF_2CF_2OCF_2COONH_4$, $F(CF_2)_4O(CF_2CF_2O)_2CF_2COONH_4$, or $F(CF_2)_2OCF(CF_3)CF_2OCF(CF_3)COONH_4$.

The content of the emulsifier is preferably from 0.01 to 15 parts by mass, more preferably from 0.1 to 10 parts by mass, per 100 parts by mass of the aqueous medium.

In the process for producing a fluorinated elastic copolymer of the present invention, the polymerization temperature is preferably from 0° C. to 50° C., more preferably from 10° C. to 40° C., further preferably from 20° C. to 30° C. If the polymerization temperature exceeds 50° C., the crosslinking reactivity of the obtainable fluorinated elastic copolymer may decrease. When the polymerization temperature is within a range of from 0° C. to 50° C., the obtained fluorinated elastic copolymer will be excellent in the crosslinking reactivity, and the crosslinked rubber will be excellent in mechanical properties.

In the method of the present invention, the radical polymerization initiator is preferably a water-soluble initiator or a redox polymerization initiator. The content of the radical polymerization initiator is preferably from 0.0001 to 3 mass %, more preferably from 0.001 to 1 mass %, to the total mass of the monomers.

The water-soluble initiator may, for example, be a persulfate such as ammonium persulfate, sodium persulfate or potassium persulfate, or an organic initiator such as a disuccinic acid peroxide or an azobisisobutylaminidine dihydrochloride, and a persulfate such as ammonium persulfate is preferred. Particularly, ammonium persulfate is most preferred.

The redox initiator may, for example, be a combination of a persulfate and a reducing agent and is preferably a polymerization initiator which makes it possible to polymerize monomers such as TFE and P at the polymerization temperature, e.g. within a range of from 0° C. to 50° C. A specific example of the persulfate may be an alkali metal persulfate such as ammonium persulfate, sodium persulfate or potassium persulfate, and preferred is ammonium persulfate. On the other hand, the reducing agent may, for example, be a thiosulfate, a sulfite, a hydrogensulfite, a pyrosulfite or a hydroxymethanesulfinic acid salt, preferably a hydroxymethanesulfinic acid salt, more preferably a hydroxymethanesulfinic acid sodium salt.

Further, it is preferred to let be present, as a third component of the redox initiator, a small amount of iron, an iron salt such as a ferrous salt, silver sulfate or the like, and it is more preferred to let a water-soluble iron salt be present. As a specific example of the water-soluble iron salt, ferrous sulfate, ferric sulfate, ferrous nitrate, ferric nitrate, ferrous chloride, ferric chloride, ammonium ferrous sulfate or ammonium ferric sulfate may, for example, be mentioned. To the redox initiator system, it is most preferred to add a chelating agent. As such a chelating agent, ethylenediamine tetraacetic acid disodium salt may be mentioned most preferably.

The amount of the persulfate to be used is preferably from 0.001 to 3 mass %, more preferably from 0.01 to 1 mass %, particularly preferably from 0.05 to 0.5 mass %, to the total amount of the monomer mixed gas injected under pressure into the aqueous medium along with the progress of polymerization. The amount of the reducing agent to be used is preferably from 0.001 to 3 mass %, more preferably from 0.01 to 1 mass %, particularly preferably from 0.05 to 0.5 mass %, to the total amount of the monomer mixed gas injected under pressure into the aqueous medium along with the progress of polymerization. Further, the amount of the third component such as iron, an iron salt such as a ferrous salt, or silver sulfate, is preferably from 0.0001 to 0.3 mass %, more preferably from 0.001 to 0.1 mass %, particularly preferably from 0.01 to 0.1 mass %, to the total amount of the monomer mixed gas injected under pressure into the aqueous medium along with the progress of polymerization. The chelating agent is preferably from 0.0001 to 0.3 mass %, more preferably from 0.001 to 0.1 mass %, particularly preferably from 0.01 to 0.1 mass %, to the total amount of the monomer mixed gal injected under pressure into the aqueous medium along with the progress of polymerization.

In the process for producing a fluorinated elastic copolymer of the present invention, the polymerization pressure is preferably from 1.0 to 10 MPaG, more preferably from 1.5 to 5.0 MPaG, most preferably from 2.0 to 4.0 MPaG. If the polymerization pressure is less than 1.0 MPaG, the polymerization rate becomes extremely low, such being undesirable. When the polymerization pressure is within the above range, the polymerization rate is proper and is easy to control, and the productivity is excellent. In the method for producing a fluorinated elastic copolymer of the present invention, the polymerization rate is preferably from 10 to 100 g/L·hr. The polymerization rate is more preferably from 5 to 70 g/L·hr, most preferably from 30 to 50 g/L·hr. If the polymerization rate is lower than the above range, the productivity tends to be low, such being practically undesirable. On the other hand, if it exceeds the above range, the molecular weight tends to be low, and the crosslinkability tends to be low, such being undesirable.

It is preferred that the latex of the fluorinated elastic copolymer obtained by the above emulsion polymerization method is agglomerated by a known method thereby to isolate the fluorinated elastic copolymer. The agglomeration method may, for example, be a method of salting out by adding a metal salt, a method of adding an inorganic acid such as hydrochloric acid, a method by means of mechanical shearing, or a method by means of freezing/thawing.

The fluorinated elastic copolymer of the present invention has a $(M_H-M_L)$ value of preferably at least 30, more preferably at least 35, further preferably at least 38, which is the difference between the maximum value $(M_H)$ of torque and the minimum value $(M_L)$ of torque measured when 100 parts by mass of the fluorinated elastic copolymer, 30 parts by mass of carbon black, 5 parts by mass of triallyl isocyanurate and 1 part by mass of 1,3-bis(tert-butylperoxyisopropyl)benzene are kneaded to prepare a fluorinated elastic copolymer composition, and its crosslinking properties are measured by means of a crosslinking property-measuring machine under conditions of 177° C. for 12 minutes with an amplitude of 3°.

Here, the kneading may be carried out under usual conditions by means of a rubber mixing apparatus such as a roll mill, a kneader, a Banbury mixer or an extruder, but kneading by means of a twin roll mill is preferred.

The Mooney viscosity of the fluorinated elastic copolymer of the present invention is preferably from 5 to 200, more preferably from 10 to 170, most preferably from 20 to 100.

The Mooney viscosity is measured in accordance with JIS K6300 (1994) by means of a L-type rotor having a diameter of 38.1 mm and a thickness of 5.54 mm at 100° C. and by setting the preliminary heating time to be 1 minute and the rotor rotation time to be 10 minutes, and it is an index of the molecular weight of the rubber. When it is within a range of from 5 to 200, the balance of the fluidity and the crosslinkability is excellent.

The glass transition temperature of the fluorinated elastic copolymer of the present invention is preferably from −40 to 20° C., more preferably from −20 to 10° C.

The specific gravity of the fluorinated elastic copolymer of the present invention is preferably from 1.57 to 1.80, more preferably from 1.60 to 1.75, particularly preferably from 1.65 to 1.75.

The fluorinated elastic copolymer composition of the present invention is preferably one containing, in addition to the above fluorinated elastic copolymer, an organic peroxide as a crosslinking agent. The content of the fluorinated elastic copolymer in the fluorinated elastic copolymer composition is preferably from 30 to 99 mass %. The fluorinated elastic copolymer composition may contain, as the case requires, various additives such as a crosslinking-assisting agent, a filler, a reinforcing agent, etc. The fluorinated elastic copolymer composition can easily be obtained by uniformly mixing the fluorinated elastic copolymer, the organic peroxide, etc., by means of a rubber mixing apparatus such as a roll mill, a kneader, a Banbury mixer or extruder. The fluorinated elastic copolymer of the present invention is preferably crosslinked by means of an organic peroxide.

The organic peroxide may, for example, be a dialkyl peroxide such as di-tert-butyl peroxide, tert-butylcumyl peroxide, dicumyl peroxide, α,α-bis(tert-butylperoxy)-p-diisopropylbenzene, 2,5-dimethyl-2,5-di(tert-butylperoxy)hexane or 2,5-dimethyl-2,5-di(tert-butylperoxy)hexane-3,1,1-di(tert-butylperoxy)-3,3,5-trimethylcyclohexane, 2,5-dimethylhexane-2,5-dihydroxy peroxide, benzoyl peroxide, tert-butyl peroxybenzene, 2,5-dimethyl-2,5-di(benzoylperoxy)hexane, tert-butylperoxymaleic acid, or tert-butylperoxyisopropyl carbonate, and a dialkyl peroxide is preferred.

The amount of the organic peroxide to be used is preferably from 0.3 to 10 parts by mass, more preferably from 0.3 to 5 parts by mass, further preferably from 0.5 to 3 parts by mass, per 100 parts by mass of the fluorinated elastic copolymer. When the amount of the organic peroxide to be used is within such a range, the crosslinking rate will be proper, and the obtained crosslinked rubber will be excellent in the balance of the tensile strength and the elongation.

Further, it is preferred to add a crosslinking-assisting agent as the case requires, since the crosslinking reaction will be improved. The crosslinking-assisting agent may, for example, be triallyl cyanurate, triallyl isocyanurate, trimethacryl isocyanurate, 1,3,5-triacryloylhexahydro-1,3,5-triazine, triallyl trimellitate, m-phenylenediaminebismaleimide, p-quinonedioxime, p,p'-dibenzoylquinonedioxime, dipropargyl terephthalate, diallyl phthalate, N,N',N'',N'''-tetraallylterephthalamide, or a vinyl group-containing siloxane oligomer such as polymethylvinylsiloxane or polymethylphenylvinylsiloxane. As the crosslinking-assisting agent, triallyl cyanurate, triallyl isocyanurate or trimethacryl isocyanurate is preferred, and triallyl isocyanurate is more preferred.

The amount of the crosslinking-assisting agent to be added is preferably from 0.1 to 20 parts by mass, more preferably from 1 to 10 parts by mass, per 100 parts by mass of the fluorinated elastic copolymer. When the amount of the crosslinking-assisting agent to be added is within such a range, the crosslinking rate will be proper, and the obtained crosslinked rubber will be excellent in the balance of the strength and the elongation.

Further, as the case requires, a metal oxide may be added to the fluorinated elastic copolymer. As such a metal oxide, a bivalent metal oxide is preferred. The bivalent metal oxide may, for example, be magnesium oxide, calcium oxide, zinc oxide or lead oxide. The amount of the metal oxide to be added is preferably from 0.1 to 10 parts by mass, more preferably from 0.5 to 5 parts by mass, per 100 parts by mass of the fluorinated elastic copolymer.

Further, the fluorinated elastic copolymer composition of the present invention may contain a pigment for coloring, a filler, a reinforcing agent, etc. A commonly employed filler or reinforcing agent may, for example, be carbon black, titanium oxide, silicon dioxide, clay, talc, polytetrafluoroethylene, polyvinylidene fluoride, polyvinyl fluoride, polychlorotrifluoroethylene, a tetrafluoroethylene/ethylene copolymer, a tetrafluoroethylene/propylene copolymer, or a tetrafluoroethylene/vinylidene fluoride copolymer.

The fluorinated elastic copolymer composition is usually crosslinked at the same time as being molded by a method of e.g. heat pressing, but it may preliminarily be molded and then crosslinked.

As the molding method, compression molding, injection molding, extrusion molding, calender molding, or as dissolved in a solvent, dipping or coating, may, for example, be employed.

As the crosslinking conditions, various conditions such as heat press crosslinking, steam crosslinking, hot air crosslinking, lead encasing crosslinking, etc. may be employed in consideration of the molding method or the shape of the crosslinked product. The crosslinking temperature is usually from 100 to 400° C., preferably within a range of a few second to 24 hours. Further, for the purpose of improving the mechanical properties or permanent compression set of the crosslinked product or stabilizing other properties, secondary crosslinking is preferably employed. The conditions for such secondary crosslinking are preferably from 100 to 300° C. for from about 30 minutes to 48 hours.

It is also preferred to crosslink the molded fluorinated elastic copolymer composition by irradiation. The radiation to be applied may, for example, be an electron beam, ultraviolet light, etc. The irradiance level in the electron radiation is preferably from 0.1 to 30 Mrad, more preferably from 1 to 20 Mrad. By such crosslinking, the permanent compression set of the obtainable crosslinked rubber can be made small. The permanent compression set is preferably at most 40, more preferably at most 30, further preferably at most 25.

In the case of crosslinking by irradiation, it is also preferred that the fluorinated elastic copolymer composition contains no organic peroxide. Particularly, in an application to electric wires, it is preferred to use, in addition to a crosslinked rubber obtained by crosslinking a fluorinated elastic copolymer composition containing an organic peroxide, a crosslinked rubber obtained by radiation crosslinking a fluorinated elastic copolymer composition containing no organic peroxide or the fluorinated elastic copolymer itself.

EXAMPLES

Now, the present invention will be described in detail with reference to Examples, but it should be understood that the present invention is by no means thereby limited. The following methods were used for the measurement of various physical properties.
(Copolymer Composition of Fluorinated Elastic Copolymer)

The copolymer composition (molar ratio (a)/(b) of repeating units (a) derived from TFE to repeating units (b) derived from P) of a fluorinated elastic copolymer was calculated by the fluorine content analysis of the fluorinated elastic copolymer.

(Glass Transition Temperature (° C.))

By means of DSC220 model manufactured by Seiko Instruments Inc., 10±0.1 mg of a fluorinated elastic copolymer was heated from −50° C. to 150° C. at a rate of 10° C./min and cooled to −50° C. at a rate of 10° C./min, whereby the center temperature in the heat absorption peak change was taken as the glass transition temperature.
(Mooney Viscosity)

The Mooney viscosity of a fluorinated elastic copolymer was measured in accordance with JIS K6300 (1994) by means of a L-type rotor having a diameter of 38.1 mm and a thickness of 5.54 mm at 100° C. and by setting the preheating time to be 1 minute and the rotor rotation time to be 4 minutes. It is indirectly indicated that the larger the value, the higher the molecular weight.
(Specific Gravity)

The specific gravity of a fluorinated elastic copolymer was measured by a method in accordance with JIS K6220-1 (2001) by using a specific gravity meter manufactured by Shinko Denshi Co., Ltd.
(Measurement of Crosslinking Properties and Crosslinked Rubber Properties)

100 Parts by mass of a fluorinated elastic copolymer, 15 parts by mass of carbon black, 5 parts by mass of triallyl isocyanurate and 1 part by mass of 1,3-bis(tert-butylperoxyisopropyl)benzene ("Perkadox 14" tradename, manufactured by Kayaku Akzo Corporation) were kneaded by a twin roll mill at room temperature for 10 minutes to obtain a uniformly mixed fluorinated elastic copolymer composition. The obtained fluorinated elastic copolymer composition was subjected to measurement of the crosslinking properties by means of a crosslinking property-measuring apparatus ("RPA2000" tradename manufactured by Alpha Technology Co., Ltd.) at 177° C. for 12 minutes with an amplitude of 3°. In the crosslinking properties, $M_H$ represents the maximum value of torque, and $M_L$ represents the minimum value of torque, and $M_H$–$M_L$ represents the crosslinking degree. Such crosslinking properties become an index of the crosslinking reactivity of the fluorinated elastic copolymer, and the larger the ($M_N$–$M_L$) value, the better the crosslinking reactivity. Further, the fluorinated elastic copolymer composition was hot-pressed at 170° C. for 20 minutes and then subjected to secondary crosslinking in an oven of 200° C. for 4 hours to obtain a crosslinked rubber sheet of the fluorinated elastic copolymer composition having a thickness of 2 mm. The obtained crosslinked rubber sheet was punched by No. 3 dumbbell to prepare a test specimen, and in accordance with JIS K6251 (1993), the 100% tensile stress, tensile strength and elongation at breakage were measured. Further, the hardness was measured in accordance with JIS K6253 (1993).
(Permanent Compression Set)

With respect to the crosslinked rubber obtained by crosslinking the above fluorinated elastic copolymer composition, a permanent compression stress test was carried out at 200° C. for 72 hours in accordance with JIS K6262 (1993), whereby the permanent compression set was measured.
(Extrusion Properties)

With respect to the above fluorinated elastic copolymer composition, a cylindrical molded product was extruded from a circular die by means of a twin screw extruder (40G-120 manufactured by Mitsuba Kogyosho, screw diameter: 40 mm, L/D=12, extrusion temperature: 90° C.), and the surface state was visually observed. Further, the thickness of the molded product was measured at 20 points for every 1 cm and evaluated by the following standards.

⊚ (excellent): No roughness is observed on the surface of the molded product, and all thicknesses are within a range of an average value±3%.

○ (good): Roughness is slightly observed on the surface of the molded product, and all thicknesses are within a range of an average value±10%.

X (no good): Roughness is substantially observed on the surface of the molded product, and some of the thicknesses exceed an average value±10%.

Example 1

Preparation of Fluorinated Elastic Copolymer A

The interior of a stainless steel pressure resistant reactor having an internal capacity of 3,200 mL and provided with stirring anchor vanes, was deaerated, and then, to the reactor, 1,500 g of ion exchanged water, 60 g of disodium hydrogenphosphate dodecahydrate, 0.9 g of sodium hydroxide, 198 g of tert-butanol, 9 g of $C_2F_5OCF_2CF_2OCF_2COONH_4$ as a fluorinated emulsifier and 3.8 g of ammonium persulfate were added. Further, an aqueous solution having 0.4 g of disodium ethylenediamine tetraacetate dihydrate (hereinafter referred to as EDTA) and 0.3 g of ferrous sulfate heptahydrate dissolved in 200 g of ion exchanged water, was added to the reactor. The pH of the aqueous medium in the reactor at that time was 9.2.

Then, a monomer mixed gas of TFE/P=95/5 (molar ratio) was injected under pressure at 24° C. so that the internal pressure of the reactor would be 2.50 MPaG. The anchor vanes were rotated at 300 rpm, and 8.8 g of 1,4-diiodoperfluorobutane was added. Then, a 2.5 mass % aqueous solution of sodium hydroxymethanesulfinate dihydrate (hereinafter referred to as Rongalite) having the pH adjusted to 10.0 with sodium hydroxide (hereinafter referred to as a Rongalite 2.5 mass % aqueous solution) was added to the reactor, and the polymerization reaction was initiated. Thereafter, the Rongalite 2.5 mass % aqueous solution was continuously added to the reactor by means of a high pressure pump.

The polymerization temperature was maintained at 24° C. to let the polymerization proceed, and along with the progress of the polymerization, the pressure in the reactor decreased, and when the internal pressure of the reactor dropped to 2.49 MPaG, a monomer mixed gas of TFE/P=70/30 (molar ratio) was injected under pressure to raise the internal pressure of the reactor to 2.51 MPaG. This operation was repeated, and the polymerization reaction was continued while maintaining the internal pressure of the reactor to be from 2.49 to 2.51 MPaG. When the total amount of the TFE/P monomer mixed gas injected under pressure became 1,000 g, addition of the Rongalite 2.5 mass % aqueous solution was terminated, and the internal temperature of the reactor was cooled to 10° C. to terminate the polymerization reaction thereby to obtain a latex of a fluorinated elastic copolymer A. The pH of the obtained latex was 7.8. The amount of the Rongalite 2.5 mass % aqueous solution added was 40 g. The polymerization time was about 7 hours.

The latex of the fluorinated elastic copolymer A was added to a 5 mass % aqueous solution of calcium chloride to agglomerate the latex of the fluorinated elastic copolymer A by salting out, whereby the fluorinated elastic copolymer A was precipitated. The fluorinated elastic copolymer A was recovered by filtration. Then, the fluorinated elastic copolymer A was washed with ion exchanged water (3,500 ml) and dried for 15 hours in an oven of 100° C. to obtain 985 g of the white colored fluorinated elastic copolymer A.

The ratio (a)/(b) of repeating units (a) derived from TFE to repeating units (b) derived from P in the fluorinated elastic copolymer A was 70/30 (molar ratio). Further, the Mooney viscosity of the fluorinated elastic copolymer A was 90, and the specific gravity was 1.76, and the glass transition temperature was −3° C.

The crosslinking properties of the fluorinated elastic copolymer A and the crosslinked rubber properties are shown in the following Table 1.

Example 2

Preparation of Fluorinated Elastic Copolymer B

A latex of a fluorinated elastic copolymer B was obtained in the same manner as in Example 1 except that the ratio of the monomer mixed gas firstly injected under pressure to the reactor was changed from TFE/P=95/5 (molar ratio) to TFE/P=93/7 (molar ratio), and the ratio of the monomer mixed gas injected under pressure during the progress of the polymerization was changed from TFE/P=70/30 (molar ratio) to TFE/P=63/37 (molar ratio). The pH of the obtained latex was 7.8. The amount of the Rongalite 2.5 mass % aqueous solution added was 50 g. The polymerization time was about 8 hours.

In the same manner as in Example 1, 960 g of the fluorinated elastic copolymer B was obtained from the latex of the fluorinated elastic copolymer B.

The ratio (a)/(b) of repeating units (a) derived from TFE to repeating units (b) derived from P in the fluorinated elastic copolymer B was 63/37 (molar ratio). Further, the Mooney viscosity of the fluorinated elastic copolymer B was 80, the specific gravity was 1.68, and the glass transition temperature was −3° C.

The crosslinking properties of the fluorinated elastic copolymer B and the crosslinked rubber properties are shown in the following Table 1.

Example 3

Preparation of Fluorinated Elastic Copolymer C

A latex of a fluorinated elastic copolymer C was obtained in the same manner as in Example 1 except that as the emulsifier, instead of $C_2F_5OCF_2CF_2OCF_2COONH_4$, 9 g of sodium laurylsulfate was added. The pH of the obtained latex was 8.0. The amount of the Rongalite 2.5 mass % aqueous solution added was 50 g. The polymerization time was about 8 hours.

In the same manner as in Example 1, 880 g of the fluorinated elastic copolymer C was obtained from the latex of the fluorinated elastic copolymer C.

The ratio (a)/(b) of repeating units (a) derived from TFE to repeating units (b) derived from P in the fluorinated elastic copolymer C was 70/30 (molar ratio). Further, the Mooney viscosity of the fluorinated elastic copolymer C was 75, the specific gravity was 1.75 and the glass transition temperature was −3° C.

The crosslinking properties of the fluorinated elastic copolymer C and the crosslinked rubber properties are shown in the following Table 1.

Comparative Example 1

Preparation of Fluorinated Elastic Copolymer D

A latex of a fluorinated elastic copolymer D was obtained in the same manner as in Example 1 except that the ratio of the monomer mixed gas firstly injected under pressure to the reactor was changed from TFE/P=95/5 (molar ratio) to TFE/P=88/12 (molar ratio), and the ratio of the monomer mixed gas injected under pressure during the progress of the polymerization was changed from TFE/P=70/30 (molar ratio) to TFE/P=56/44 (molar ratio). The pH of the obtained latex was 8.0. The amount of the Rongalite 2.5 mass % aqueous solution added was 90 g. The polymerization time was about 6 hours.

In the same manner as in Example 1, 960 g of the fluorinated elastic copolymer D was obtained from the latex of the fluorinated elastic copolymer D.

The ratio (a)/(b) of repeating units (a) derived from TFE to repeating units (b) derived from P in the fluorinated elastic copolymer D was 56/44 (molar ratio). Further, the Mooney viscosity of the fluorinated elastic copolymer D was 85, the specific gravity was 1.55 and the glass transition temperature was −3° C.

The crosslinking properties of the fluorinated elastic copolymer D and the crosslinked rubber properties are shown in the following Table 1.

TABLE 1

| | Ex. 1 | Ex. 2 | Ex. 3 | Comp. Ex. 1 |
|---|---|---|---|---|
| Fluorinated elastic copolymer | A | B | C | D |
| $M_H$ [dNm] | 86 | 73 | 70 | 40 |
| $M_L$ [dNm] | 8 | 4 | 3 | 7 |
| $M_H$-$M_L$ [dNm] | 78 | 69 | 67 | 33 |
| Tensile strength [MPa] | 30 | 20 | 18 | 15 |
| 100% tensile stress [MPa] | 14 | 8 | 6 | 5 |
| Elongation at breakage [%] | 220 | 280 | 240 | 320 |
| Hardness [shore A] | 93 | 78 | 87 | 65 |
| Permanent compression set [%] | 20 | 23 | 28 | 35 |
| Extrusion properties | ◎ | ○ | ◎ | X |

(Automatic Transmission Oil Immersion Test)

The above-mentioned test specimen prepared by punching out the crosslinked rubber sheet by No. 3 dumbbell was immersed for 2,000 hours in automatic transmission oil (tradename: TOYOTA JUNSEI AUTO FLUID D-II) maintained at 175° C. and then taken out, and the tensile strength and elongation at breakage were measured in accordance with JIS K6251 (1993), and the retention of the tensile strength and the retention of the elongation at breakage as between before and after the immersion were measured. Further, the volume change of the test specimen between before and after the immersion was calculated. Here, the volume change was measured by the following method. the results are shown in Table 2.

(Volume Change)

The volumes of the respective test specimen were measured by means of an automatic gravity meter DMA-220H manufactured by Shinko Denshi Co., Ltd., and the volumes of test specimen before and after the immersion, the volume change was calculated by the following formula.

Volume change (%)=[(Volume after immersion−Volume before immersion)/(Volume before immersion)]×100

TABLE 2

| | Ex. 1 | Ex. 2 | Ex. 3 | Comp. Ex. 1 |
|---|---|---|---|---|
| Retention of tensile strength [%] | 86 | 73 | 70 | 40 |
| Retention of elongation at breakage [%] | 98 | 95 | 95 | 60 |
| Volume change [%] | 3 | 6 | 5 | 30 |

Each of the fluorinated elastic copolymers in Examples 1 to 3 wherein the molar ratio (a)/(b) of repeating units (a) derived from tetrafluoroethylene to repeating units (b) derived from propylene is within the range of the present invention, had a large ($M_H$−$M_L$) value, showed an excellent crosslinking reactivity, had a smooth extrusion molded product surface and showed excellent crosslinked rubber properties, and a high retention of physical properties and a small volume change to automatic transmission oil.

On the other hand, the fluorinated elastic copolymer in Comparative Example 1 wherein the molar ratio (a)/(b) was outside the range of the present invention, was inferior to Examples in the crosslinking reactivity and crosslinked rubber properties and particularly substantially inferior in the smoothness of the surface of the extrusion molded product, and showed a large decrease of the physical properties and a large volume change after immersion in automatic transmission oil.

INDUSTRIAL APPLICABILITY

The fluorinated elastic copolymer of the present invention can be made to be a crosslinked rubber by a crosslinking reaction. The crosslinked rubber is suitable as a material of e.g. O-rings, sheets, gaskets, oil seals, diaphragms, V-rings, etc. and applicable also to applications as e.g. a heat resistant and chemical resistant sealing material, a heat resistant and oil resistant sealing material, a coating material for electric wires, a sealing material for semiconductor devices, an anticorrosive rubber coating material, a sealing material for urea resistant greases. As it is particularly excellent in extrusion properties, the crosslinked rubber is useful as e.g. a covering material for electric wires, a rubber product in a tube or sheet form, etc.

This application is a continuation of PCT Application No. PCT/JP2011/051652, filed Jan. 27, 2011, which is based upon and claims the benefit of priority from Japanese Patent Application No. 2010-019228 filed on Jan. 29, 2010. The contents of those applications are incorporated herein by reference in its entirety.

What is claimed is:

1. A fluorinated elastic copolymer obtained by copolymerizing monomers consisting of tetrafluoroethylene and propylene, wherein the molar ratio (a)/(b) of repeating units (a) derived from tetrafluoroethylene to repeating units (b) derived from propylene in the fluorinated elastic copolymer is from 65/35 to 70/30, and wherein said fluorinated elastic copolymer has a specific gravity of 1.75-1.80.

2. The fluorinated elastic copolymer according to claim 1, which comprises iodine atoms.

3. A fluorinated elastic copolymer composition comprising the fluorinated elastic copolymer as defined in claim 1.

4. A fluorinated elastic copolymer obtained by copolymerizing tetrafluoroethylene, propylene and a perfluoroalkyl vinyl ether, wherein the molar ratio (a)/(b) of repeating units (a) derived from tetrafluoroethylene to repeating units (b) derived from propylene in the fluorinated elastic copolymer is from 60/40 to 75/25, and repeating units (c) derived from said perfluoroalkyl vinyl ether are present in a positive amount up to and including 10 mol % in the fluorinated elastic copolymer.

5. The fluorinated elastic copolymer according to claim 4, wherein said perfluoroalkyl vinyl ether is perfluoromethyl vinyl ether or perfluoropropyl vinyl ether.

6. The fluorinated elastic copolymer according to claim 4, which comprises iodine atoms.

7. A fluorinated elastic copolymer composition comprising the fluorinated elastic copolymer as defined in claim 4.

\* \* \* \* \*